United States Patent [19]
Fielding

[11] Patent Number: 5,786,914
[45] Date of Patent: Jul. 28, 1998

[54] WDM CHANNEL INSERTION

[75] Inventor: Alan Fielding, Bishops Stortford, United Kingdom

[73] Assignee: Northern Telecom Limited, Montreal, Canada

[21] Appl. No.: 739,365

[22] Filed: Oct. 29, 1996

[30] Foreign Application Priority Data

Dec. 16, 1995 [GB] United Kingdom ............... 9525765

[51] Int. Cl.⁶ .................................................. H04J 14/02
[52] U.S. Cl. .......................... 359/124; 359/130; 359/187; 385/24; 385/37
[58] Field of Search ........................... 359/110, 124, 359/130, 132, 161–162, 173, 181, 187–188; 385/4, 10, 24, 37

[56] References Cited

U.S. PATENT DOCUMENTS

| 5,321,543 | 6/1994 | Huber | 359/187 |
| 5,513,030 | 4/1996 | Epworth | 359/187 |
| 5,532,857 | 7/1996 | Gertel et al. | 359/187 |

*Primary Examiner*—Kinfe-Michael Negash
*Attorney, Agent, or Firm*—John D. Crane

[57] ABSTRACT

A channel insertion filter for a WDM system is provided by an optical waveguide Mach Zehnder comprising a pair of 3dB couplers interconnected by a pair of interference arms in which are created a pair of Bragg reflectors. These reflectors are partially reflecting at the channel insertion wavelength so that some of the light of the associated channel transmitter is transmitted by them to provide a feedback control loop error signal for regulating the emission wavelength of the transmitter.

2 Claims, 1 Drawing Sheet

5,786,914

1
WDM CHANNEL INSERTION

BACKGROUND OF THE INVENTION

This invention relates to wavelength division multiplexed (WDM) transmission systems in which different channels of information propagate in a common transmission path by being transmitted within different wavebands. The invention relates in particular to channel insertion in such systems.

In a WDM transmission system it is generally desirable for the mean wavelength of each channel to be specified within closely defined limits. This simplifies the filtering required for channel insertion and channel dropping, and also enables closer packing of the channels within any particular spectral range.

One way of stabilising the emission wavelength of a transmitter for a particular channel of a WDM transmission system, hereinafter referred to as a channel transmitter, that is constituted by a directly or indirectly modulated diode laser is to apply part of that emission to a filter, typically a distributed Bragg reflector fabricated in single mode optical waveguide, and to use its spectral filtering properties to generate a feedback control error signal employed to regulate the mean emission wavelength of the laser, for instance by regulation of its temperature or its mean drive current.

SUMMARY OF THE INVENTION

In a WDM transmission system according to a first aspect of the present invention there is provided a method of channel insertion wherein the same filter is employed for both channel insertion and for deriving an error control signal used in regulating the emission wavelength of the optical source of the channel being inserted.

According to a second aspect of the present invention there is provided a method of stabilising the emission wavelength of a wavelength division multiplexed transmission system channel transmitter whose emission is multiplexed on to a transmission path using a channel insertion filter employing an optical waveguide Mach Zehnder with a pair of equal optical path length interference arms in which are respectively included a matched pair of spectrally selective retro-reflecting distributed Bragg partial reflectors, wherein light from the transmitter transmitted by the Bragg reflectors is employed to provide a feedback control loop error signal used to regulate the emission wavelength of the transmitter.

The invention also provides a wavelength division multiplexed transmission system channel transmitter and associated channel insertion filter, wherein the channel insertion filter comprises a 4-port Mach Zehnder optical waveguide configuration having a pair of equal optical path length interference arms in which are respectively included a matched pair of spectrally selective retro-reflecting distributed Bragg partial reflectors, wherein three of the four ports of the Mach Zehnder configuration respectively constitute input, output and channel insertion ports of the channel insertion filter, and wherein the fourth of the four ports constitutes a feedback output port optically coupled with a detector in an emission wavelength control feedback loop regulating the mean emission wavelength of the channel transmitter.

BRIEF DESCRIPTION OF THE DRAWING

There follows a description of a channel transmitter and associated channel insertion filter embodying the invention in a preferred form. The description refers to the accompanying drawing which is a schematic representation of the transmitter and channel insertion filter combination.

DETAILED DESCRIPTION OF A PREFERRED EMBODIMENT

Figure 1:
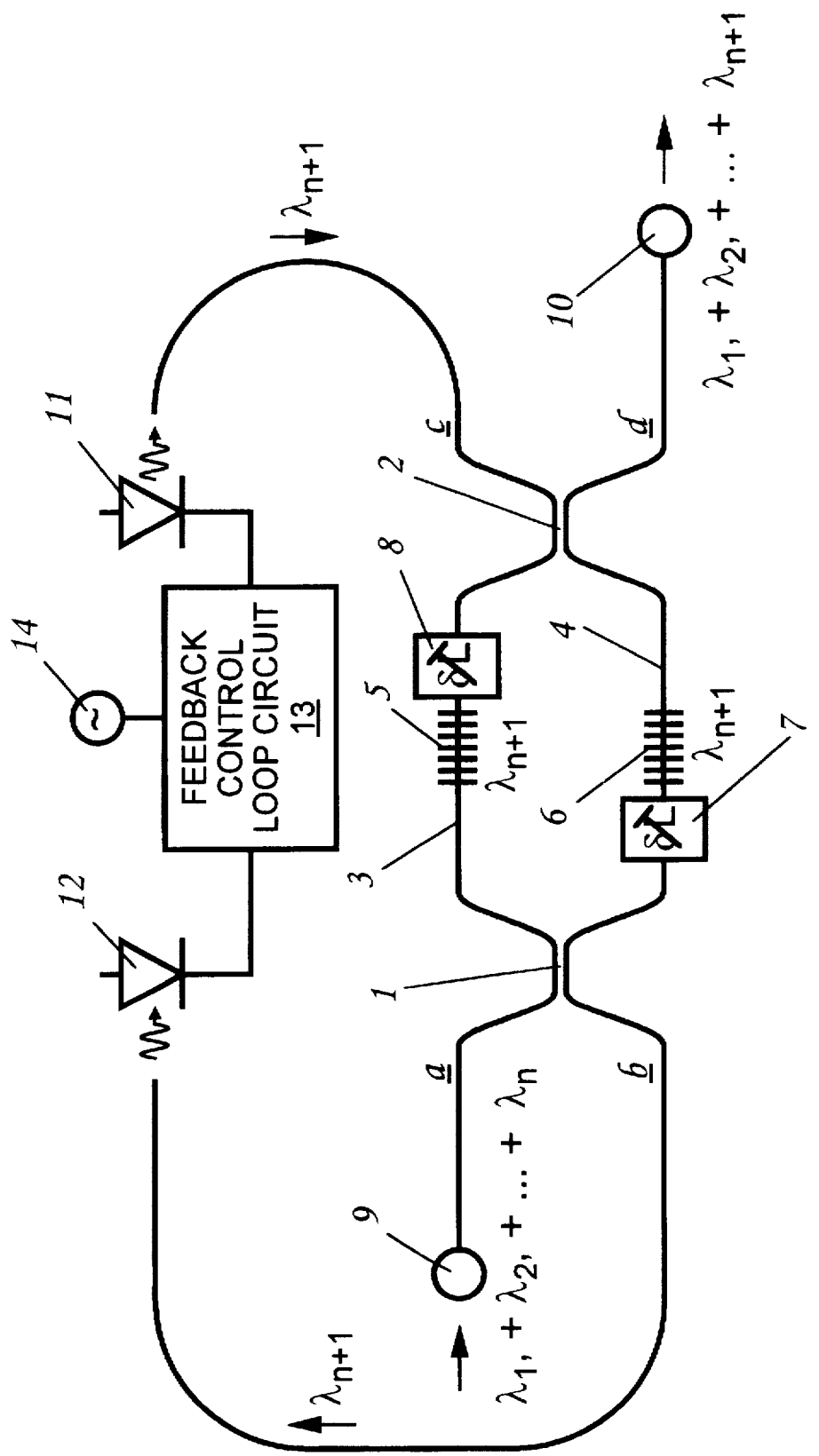

A channel insertion filter is provided by a 4-port Mach Zehnder optical waveguide configuration constituted by a pair of 2×2 single mode optical waveguide 3dB couplers 1 and 2 interconnected by a pair of single mode optical waveguides 3 and 4 constituting equal optical path length interference arms of the Mach Zehnder. (The four ports of the Mach Zehnder are designated a, b, c and d in the drawing). The optical waveguides of the Mach Zehnder may be constructed in integrated optics format, or alternatively in optical fibre format. A matched pair of retro-reflecting distributed Bragg reflective gratings 5 and 6 are created respectively in optical waveguides 3 and 4. These Bragg gratings are selectively reflecting at a wavelength $\lambda_{n+1}$, which is the wavelength of the channel to be inserted by this channel insertion filter.

The two interference arms 3 and 4 of the Mach Zehnder are required to be of equal optical path length so that for light of any wavelength not reflected by the Bragg reflectors 5 and 6 that is launched into the Mach Zehnder by way of port a emerges by way of port d, while that launched by way of port b emerges by way of port c. Equality of optical path distance can be provided by an optical path length trimming adjuster 7 located in one of the interference arms. Such an adjuster may be constituted by a region of the waveguide where the effective refractive index can be changed utilising the photo-refractive effect produced by irradiation with a high flux density of ultra-violet light.

Similarly the Bragg gratings are required either to be equidistant in optical path length terms from 3dB coupler 2, or to differ in optical path length by an amount producing, at wavelength $\lambda_{n+1}$, a phase angle difference of $n\pi$, where n is an integer. This is in order that light of wavelength $\lambda_{n+1}$ that is launched into the Mach Zehnder by way of port c, and that is reflected by Bragg gratings 5 and 6, emerges by way of port d. The equality of optical path length, or the difference providing the required phase relationship, can be provided by an additional optical path length trimming adjuster 8 of similar type to that of adjuster 7. The Bragg reflectors 5 and 6 are partial reflectors, not total reflectors, even at their peak reflectivity wavelength $\lambda_{n+1}$, and so the fraction of the light at this wavelength that is launched into port c, and is transmitted by the Bragg reflectors, emerges from the Mach Zehnder by way of port b as the result of the match in optical path length of the two interference arms 3 and 4.

An input terminal 9, and an output terminal 10, are optically coupled respectively to ports a and d of the Mach Zehnder, while the emission of channel transmitter, represented by laser diode 11, is optically coupled with port c. The construction of Mach Zehnder, as described above, ensures that it acts as a channel insertion filter having the property that traffic applied to its input terminal 9 in different wavelength multiplexed channels of wavelengths $\lambda_1, \lambda_2 \ldots \lambda_n$ (specifically excluding the channel of wavelength $\lambda_{n+1}$) pass through the filter to emerge, under ideal conditions, exclusively from the output port 10.

If the Bragg reflectors 5 and 6 had been total reflectors (100% reflectors) at wavelength $\lambda_{n+1}$, then all the light at wavelength $\lambda_{n+1}$ launched into the Mach Zehnder from the channel transmitter 11 by way of port c would similarly have emerged from the Mach Zehnder by way of the output terminal 10. Under these circumstances the Mach Zehnder would have functioned as a lossless wavelength multiplexer multiplexing the channel of wavelength $\lambda_{n+1}$ on to the pre-existing group of channels of wavelengths $\lambda_1, \lambda_2 \ldots \lambda_n$.

The fact that the Bragg reflectors 5 and 6 are less than totally reflecting at wavelength $\lambda_{n+1}$ means that not all of the light at wavelength $\lambda_{n+1}$ launched into the Mach Zehnder from the channel transmitter 11 by way of port c will emerge from the Mach Zehnder by way of the output terminal 10; instead a proportion will emerge by way of port b. If, for instance, at wavelength $\lambda_{n+1}$ the Bragg reflectors 5 and 6 transmit at a power level of −15dB, this represents the addition of a loss of only about 0.1dB to the power at $\lambda_{n+1}$ coupled from the channel transmitter 11 to the output terminal 10 as the direct result of using Bragg reflectors that are non-total at wavelength $\lambda_{n+1}$.

The power coupled into port b is employed to provide an error signal which is detected by detector 12 and used in a feedback control loop circuit 13 for regulating the emission wavelength of transmitter 11. For this purpose the output of an oscillator 14 may be employed in the feedback control loop circuit to dither the emission wavelength. The optical power launched into port b from port c passes through a minimum as the emission wavelength is swept through $\lambda_{n+1}$. Phase detection techniques can therefore be used to derive a mean wavelength regulation control signal that changes sign on passing through $\lambda_{n+1}$. In the case of a laser diode transmitter 11, such a control signal may be used for instance to regulate the mean drive current applied to the laser diode or to regulate its temperature.

The use of the Bragg gratings 5 and 6 of the Mach Zehnder for stabilising the emission wavelength of the channel transmitter has the advantage of dispensing with the requirement of an additional component for this purpose, and moreover precludes the possibility of a discrepancy building up between the stabilised emission wavelength and the wavelength coupled into the transmission path by the channel insertion filter.

If the channel insertion filter Mach Zehnder is constructed in optical fibre format, then it may be advantageous to construct it in the manner described in GB 2 283 831 with particular reference to its FIG. 5. In these circumstances the interference arms 3 and 4 are secured together in side-by-side contact over this full length between the 3dB couplers 1 and 2, and in this way the risk is reduced of environmental factors, such as changes of temperature, upsetting the performance of the Mach Zehnder by acting differentially upon the two interference arms.

What is claimed is:

1. A wavelength division multiplexed transmission system channel transmitter and associated channel insertion filter, wherein the channel insertion filter comprises a 4-port Mach Zehnder optical waveguide configuration having a pair of equal optical path length interference arms in which are respectively included a matched pair of spectrally selective retro-reflecting distributed Bragg partial reflectors, wherein three of the four ports of the Mach Zehnder configuration respectively constitute input, output and channel insertion ports of the channel insertion filter, and wherein the fourth of the four ports constitutes a feedback output port optically coupled with a detector in an emission wavelength control feedback loop regulating the mean emission wavelength of the channel transmitter.

2. A method of stabilizing the emission wavelength of a wavelength division multiplexed transmission system channel transmitter comprising the steps of:

multiplexing the emission of the transmission system on to a transmission path with a channel insertion filter utilizing an optical waveguide Mach Zehnder with a pair of equal optical path length interference arms; and positioning a spectrally selective retro-reflecting distributed Bragg partial reflector in each said interference arm to provide a feedback control loop error signal to regulate the emission wavelength of the transmitter.

* * * * *